United States Patent [19]

Harris et al.

[11] Patent Number: 5,110,049

[45] Date of Patent: May 5, 1992

[54] ROTATABLE BOOM SYSTEM FOR DISPENSING FLUIDS

[75] Inventors: A. Joe Harris, Garland; Wallace L. Grace, Terrell, both of Tex.

[73] Assignee: Dilling-Harris and Ginsan, Inc., Dallas, Tex.

[21] Appl. No.: 618,751

[22] Filed: Nov. 27, 1990

[51] Int. Cl.⁵ .............................................. B05B 15/06
[52] U.S. Cl. ..................................... 239/209; 239/526; 239/588; 134/123; 15/DIG. 2
[58] Field of Search ............... 239/195, 209, 526, 530, 239/587, 588; 134/123, 180; 15/DIG. 2; 137/580

[56] References Cited

U.S. PATENT DOCUMENTS

| | | |
|---|---|---|
| 1,970,674 | 8/1934 | Seibert et al. ............... 239/209 |
| 2,948,479 | 8/1960 | Graceman ..................... 239/588 |
| 3,072,130 | 1/1963 | Grabenhorst .................. 134/123 |
| 3,265,087 | 8/1966 | Livingston .................... 239/588 |
| 3,356,102 | 12/1967 | Johnson ....................... 134/123 |
| 3,451,628 | 6/1969 | Kelley ......................... 134/123 |
| 3,517,694 | 6/1970 | Lieffring ...................... 137/580 |

Primary Examiner—Andres Kashnikow
Assistant Examiner—Karen B. Merritt
Attorney, Agent, or Firm—Warren B. Kice

[57] ABSTRACT

A boom system for dispensing fluids in which two or more boom arms are mounted for rotation on a fixed tubular member. Each boom arm is capable of unlimited angular rotation about the axis of the tubular member and first and second fluids are independently directed to the first and second boom arms, respectively, for discharge thereby.

30 Claims, 1 Drawing Sheet

ROTATABLE BOOM SYSTEM FOR DISPENSING FLUIDS

BACKGROUND OF THE INVENTION

The invention is directed to a rotating boom system, and, more particularly, to such a system in which two or more boom arms are rotatable about a single axis in a car wash bay, or the like, for discharging fluids.

Most self-service car washes employ a coin-operated apparatus for washing, waxing, and rinsing vehicles. Such washes commonly utilize two independent boom systems that support hoses connected to separate, hand-held spray wand or brush assemblies. One such boom system is usually mounted centrally in the wash bay and over the vehicle and supports a hose, a trigger gun and a wash wand, including a nozzle assembly for the spray application of a high pressure fluid such as soap solution, an engine/tire cleaner, and/or clear water for rinsing. The other boom system is usually mounted centrally on one wall of the wash bay and supports a hose to which is connected a handle and foaming brush assembly.

It is necessary to mount the foaming brush boom system in the above manner remotely from the high pressure boom system so that interference between the two boom arms and hose assemblies is avoided while one is being used. However, this arrangement has several disadvantages. For example, since the foaming brush boom is usually located on one side of the bay, it is capable of only 180° rotation. Therefore, to reduce the opportunity for interference with the high pressure boom, the pivot for the foaming brush boom must be mounted at a slight angle from vertical, which induces the boom arm to seek a "home" location against the wall on which it is mounted. When the foaming brush is used to wash a vehicle on the side of the bay opposite from the wall on which the foaming brush boom is mounted, the hose of the latter boom must be dragged across the top or ends of the vehicle, and the free movement of the brush handle is hindered by unwanted movement of the foam brush boom arm toward its "home" location. Another disadvantage of this arrangement is that separate foaming brush and high pressure boom assemblies require additional time and expense during initial installation, and add to the amount of visual clutter in the wash bay.

Attempts to solve these problems include an arrangement in which both booms are mounted on a single pivot located centrally above the vehicle in the wash bay. This arrangement has not been successful since, although one boom arm can be mounted for free rotation, the other arm is limited by a fixed hose connection permitting limited angular rotation in one direction. This lack of free, unlimited angular movement of both arms for a full 360° is a substantial disadvantage in routine operations, and boom systems of this type have never been successful.

SUMMARY OF THE INVENTION

It is therefore an object of the present invention to provide a rotating boom system for use in self service car washes which overcomes the disadvantages of the prior art.

It is a further object of the present invention to provide a boom system of the above-type in which at least two boom arms are provided, each of which is capable of unlimited angular rotation about the same axis.

It is a still further object of the present invention to provide a system of the above type which eliminates interference between the boom arms.

It is a still further object of the present invention to provide a system of the above type which minimizes any dragging of hoses across the vehicle being washed.

It is a still further object of the present invention to provide a system of the above type in which two or more fluids are independently provided to two or more boom arms, respectively, for discharge thereby.

It is a still further object of the present invention to provide a system of the above type in which a freely movable wash wand and a foaming brush assembly are attached to the boom arms for discharging the fluids.

It is a still further object of the present invention to provide a system of the above type which is relatively easy to install, neat in appearance, and efficient in operation.

Toward the fulfillment of these and other objects an integrated boom system is mounted above the vehicle in the center of a wash bay and contains two or more boom arms mounted for unlimited angular rotation about the axis of a fixed tubular member. Two or more fluids are independently directed to the boom arms for discharge thereby.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
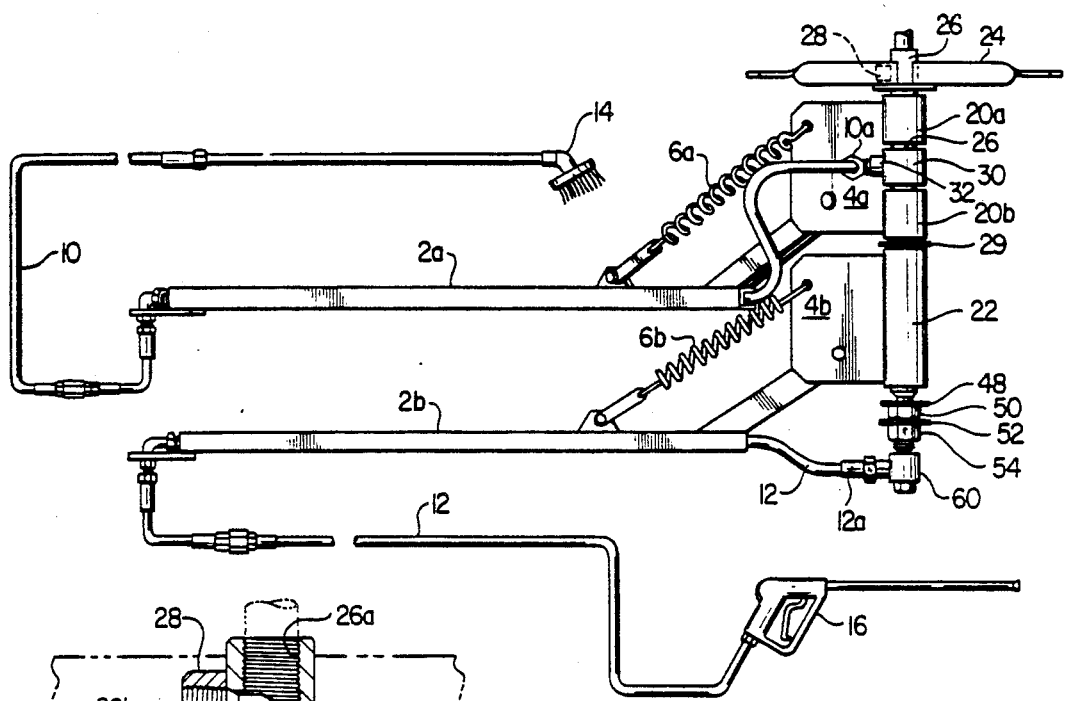
FIG. 1 is a perspective view of the boom system of the present invention.
Figure 2:
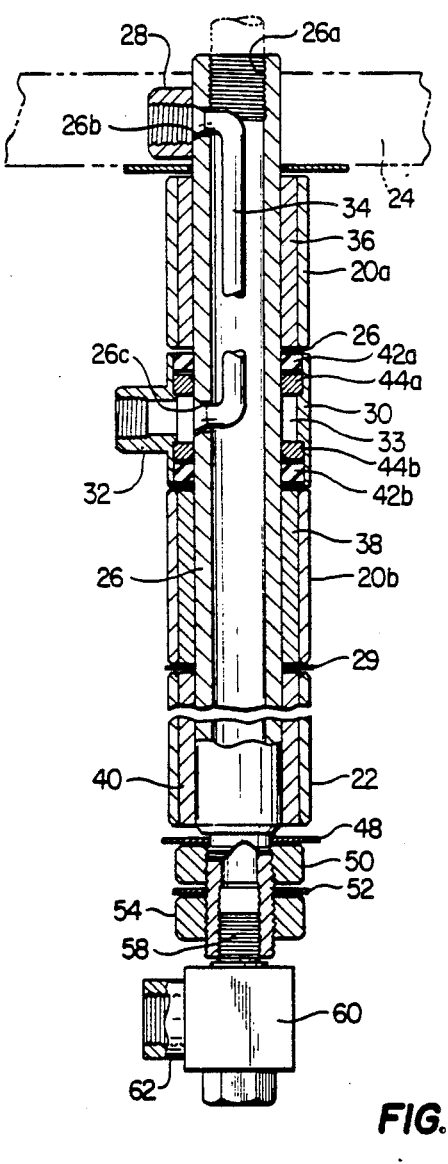
FIG. 2 is an enlarged vertical cross-sectional view of the system of FIG. 1.

The boom system of the present invention is depicted in FIGS. 1 and 2 of the drawings and includes two boom arms 2a and 2b (shown only in FIG. 1) having angled end portions pivotally connected to two mounting brackets 4a and 4b, respectively. Two springs 6a and 6b are connected between the arms 2a and 2b and the brackets 4a and 4b, respectively, to normally urge the arms 2a and 2b into the horizontal positions shown in FIG. 1.

A pair of hoses 10 and 12 extend through the length of the boom arms 2a and 2b, respectively, and project outwardly therefrom. Externally threaded fittings 10a and 12a are attached to one end of the hoses 10 and 12, respectively, for reasons to be described. The other ends of the hoses 10 and 12 project from the distal ends of the boom arms 2a and 2b, respectively, and are connected to a foaming brush assembly 14 and a trigger-actuated wand, or nozzle, assembly 16, respectively. A pair of spaced sleeves 20a and 20b are connected along one edge of the bracket 4a, and a sleeve 22 is connected along one edge of the bracket 4b.

A mounting bracket assembly 24 is bolted, or otherwise affixed, to the overhead structure of a car wash bay, or the like, and receives the upper end portion of a tube 26 which is secured to the bracket 24 in any known manner. The inner bore of the upper end portion of the tube 26 is threaded, as shown by the reference numeral 26a in FIG. 2, for receiving an externally threaded fitting, pipe or hose to supply the tube 26 with a fluid, as will be described. A radially extending fitting 28 is affixed to the wall of the tube 26 and registers with the bore of the latter tube through an aligned opening 26b formed through the wall of the tube. The inner bore of the outer end portion of the fitting 28 is threaded for receiving an externally threaded tee fitting (not shown) connected to another source of fluid and to a source of air.

The sleeves 20a, 20b and 22 extend over the tube 26 and their inner diameters are greater than the outer diameter of the tube to permit unlimited angular rotation of the sleeves, and therefore the brackets 4a and 4b and the boom arms 2a and 2b, respectively, about the axis of the tube 26. A washer 29 extends over the tube 26 and between the sleeves 20b and 22.

A sleeve 30 is also mounted over the tube 26 and extends between the sleeves 20a and 20b. A radially extending fitting 32 is formed integrally with the sleeve 30 and registers with an annular chamber 33 defined between the sleeve 30 and the tube 26. The inner bore of the outer end portion of the fitting 32 is threaded for receiving an elbow fitting (not shown) which is connected to the fitting 10a of the hose 10. An opening 26c is formed through the wall of the tube 26 and communicates with the chamber 33.

A conduit 34 (FIG. 2) extends within the bore of the tube 26 and its respective ends extend within, and are secured relative to, the openings 26b and 26c in the tube. Thus fluid flow is permitted between the fittings 28 and 32, via the conduit 34.

Three bushings 36, 38 and 40 extend between the tube 26 and the sleeves 20a, 20b and 22, respectively, in order to support and facilitate rotation of the latter sleeves. The bushings 36, 38 and 40 are constructed of a material having a relatively low coefficient of friction, such as plastic.

A pair of seal rings 42a and 42b are disposed between the tube 26 and the internal wall of the sleeve 30 at the respective ends of the latter sleeve to enclose the chamber 33 and seal against the egress of fluid therefrom. A pair of bushing rings 44a and 44b also extend between the tube 26 and the sleeve 30, with the ring 44a extending slightly below the seal ring 42a, and the ring 44b extending slightly above the seal ring 42b. The bushing rings 42a and 42b support and facilitate rotation of the sleeve 30 and can also be fabricated of a plastic material.

The lower end portion of the tube 26 has a reduced diameter and receives a thrust washer 48. The external surface of the lower end portion of the tube 2 extending below the washer 48 is threaded and receives a nut 50 which supports the washer 48. A lock washer 52 also extends over this portion of the tube 26 just below the nut 50, and an additional nut 54 is threaded to the lower end of the tube 26 and extends below the washer 52. Thus the sleeve 22, and therefore the sleeves 20a, 20b and 30, are retained on the tube 26.

The internal surface of the lower end portion of the tube 26 is also threaded and receives an externally threaded hollow shaft 58 that is a component of a fluid swivel 60 of conventional design. The construction of swivel 60 is such that its external body is capable of unlimited angular rotation around the shaft 58. Radially extending from the external body of swivel 60 is an internally threaded fitting 62 that receives the fitting 12a of hose 12.

In operation, a high pressure fluid is delivered to the upper end of the tube 26 by an external fitting, pipe or hose connected to the upper, internally threaded portion of the tub 26. This fluid passes downwardly through the length of the tube 26, through the swivel 60 and the hose 12 before discharging, via the nozzle assembly 16. Fluid and air are respectively introduced to the tee fitting (not shown) connected to the fitting 28 and pass through the conduit 34 internally of the tube 26 before discharging into the chamber 33. The volume and pressure of the fluid and air build up in the chamber 33 before flowing out through the fitting 32 and to the hose 10 before discharging, via the foaming brush assembly 14. The arms 2a and 2b can each be independently rotated a full 360° and can be pivoted downwardly against the force of the springs 6a and 6b, to permit maximum flexibility during use.

It is understood that several different types of fluids can be used in the system of the present invention. For example, the fluid introduced to the upper end of the tube 26, which is discharged by the nozzle assembly 16, can be clear water, liquid soap, liquid wax. liquid engine tire cleaner or the like; while the fluid delivered to the tee fitting connected to the inlet fitting 28, which is discharged from the foaming brush assembly 14, can be a soap or detergent solution which is "foamed" by the air delivered to the fitting 28.

It is thus seen that the present invention enjoys several advantages. For example, both of the boom arms 2a and 2b are capable of a full 360° angular rotation around a common axis while eliminating potential interference between the two boom arms. Further, the above is achieved while eliminating the requirement to drag hoses across the vehicle being washed. Also, separate fluids can be independently delivered to the boom arms 2a and 2b for discharge by the foaming brush assembly 14 and the nozzle assembly 16, respectively. Further because the sleeve 30 is fabricated as a separate component, it receives none of the mechanical loading from the boom arm 2a therefore increasing the life of the seals 42a and 42b. Still further, the system of the present invention is relatively easy to install, neat in appearance, and efficient in operation.

It is understood that several variations may be made in the foregoing without departing from the scope of the invention. For example, although only two boom arms have been shown as an example of the present invention, it is understood that more than two can be provided in the same manner as discussed above. Also, the sleeves 20a, 20b and 30 can be formed into one elongated sleeve attached to the bracket 4a. Further, it is understood that the system of the present invention is not limited to a car wash and that any type of fluids can be introduced to, and discharged from, the boom arms of the present invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A rotatable boom system comprising a fixed tubular member, first and second sleeve means, respectively, extending over said tubular member and adapted to rotate relative to said tubular member, and first and second boom members attached to said first and second sleeve means, respectively, means for introducing a first fluid into said tubular member, means for introducing a second fluid into said tubular member independently of said first fluid, and means for directing said first and second fluids to said first and second boom members, respectively.

2. The system of claim 1 wherein each of said sleeve means, and therefore each of said boom members, is adapted for unlimited angular rotation about the axis of said tubular member.

3. The system of claim 1 further comprising discharge means for discharging said first and second fluids from said first and second boom members, respectively.

4. The system of claim 1 wherein said first fluid introducing means comprises a first opening provided at one end of said tubular member, and wherein said second fluid introducing means comprises a second opening extending through a wall of said tubular member.

5. The system of claim 4 wherein said second fluid introducing means further comprises an inlet fixture mounted on said tubular member in registration with said second opening.

6. The system of claim 1 wherein said directing means comprises first outlet means associated with said tubular member for receiving and discharging said first fluid, and second outlet means associated with said tubular member and located in a spaced relation to said first outlet means for receiving and discharging said second fluid.

7. The system of claim 1 wherein said second sleeve means comprises a pair of axially spaced sleeves mounted on said tubular member.

8. A rotatable boom system comprising a fixed tubular member, first boom means mounted to said tubular member for rotation relative to said tubular member, second boom means mounted to said tubular member for rotation relative to said tubular member, means for introducing a first fluid into said tubular member, means for introducing a second fluid into said tubular member independently of said first fluid, first outlet means associated with said tubular member for receiving and discharging said first fluid, second outlet means associated with said tubular member and located in a spaced relation to said first outlet means for receiving and discharging said second fluid, a first hose extending through at least a portion of said first boom means and connected at one end to said first outlet means for receiving said first fluid and directing it to said first boom means and a second hose extending through at least a portion of said second boom means and connected at one end to said second outlet means for receiving said second fluid and directing it to said second boom means.

9. The system of claim 8 wherein said first outlet means comprises an opening provided at one end of said tubular member.

10. The system of claim 9 wherein said first outlet means further comprises a swivel sleeve mounted at said one end of said tubular member in communication with said opening for receiving said first fluid, said swivel sleeve having an opening formed therein for connection to said first boom means.

11. A rotatable boom system comprising a fixed tubular member; first boom means mounted to said tubular member for rotation relative to said tubular member; second boom means mounted to said tubular member for rotation relative to said tubular member; means for introducing a first fluid into said tubular member; means for introducing a second fluid into said tubular member independently of said first fluid; and means for directing said first and second fluids to said first and second boom means, respectively, said directing means comprising first outlet means associated with said tubular member for receiving and discharging said first fluid, and second outlet means associated with said tubular member and in a spaced relation to said first outlet means for receiving and discharging said second fluid, said second outlet means comprising an opening extending through the wall of said tubular member, additional sleeve means mounted on said tubular member for rotation relative thereto, an outlet fitting on said additional sleeve means, and means connecting said outlet fitting with said opening during rotation of said additional sleeve means.

12. The system of claim 11 wherein said additional sleeve means is adapted to rotate relative to said tubular member independently of the rotation of said first and second sleeve means.

13. The system of claim 11 wherein said connecting means comprises means defining an annular chamber between said tubular member and said additional sleeve means for receiving said second fluid and permitting said rotation of said additional sleeve means relative to said tubular member and the discharge of said second fluid from said outlet fitting.

14. The system of claim 13 wherein said defining means comprises seal means disposed at each end of said additional sleeve means and extending between said additional sleeve means and said tubular member.

15. The system of claim 14 further comprising a conduit connecting said second fluid introducing means with said opening and extending in at least a portion of the bore of said tubular member for permitting the flow of said second fluid to said additional sleeve means independently of the flow of said first fluid through said tubular member.

16. A rotatable boom system comprising a fixed tubular member, first and second sleeve means, means mounting said first and second sleeve means on said tubular member for unlimited angular rotation about the axis of said tubular member, first and second boom members attached to said first and second sleeve means, respectively, and means for introducing a first and a second fluid to said first and a second boom members, respectively, for discharge by said boom members.

17. The system of claim 16 wherein said second sleeve means comprises a pair of axially spaced sleeves mounted on said tubular member.

18. The system of claim 16 wherein each of said booms members comprises discharge members for discharging said fluids.

19. The system of claim 16 wherein said introducing means comprises means for introducing first and second fluids to said tubular member and means for directing said first and second fluids to said first and second boom members, respectively.

20. The system of claim 19 wherein said first fluid introducing means comprises a first opening provided at one end of said tubular member, and wherein said second fluid introducing means comprises a second opening extending through a wall of said tubular member.

21. The system of claim 20 wherein said second fluid introducing means further comprises an inlet fixture mounted on said tubular member in registery with said second opening.

22. The system of claim 19 wherein said directing means comprises first outlet means associated with said tubular member for receiving and discharging said first fluid, and second outlet means associated with said tubular member and located in a spaced relation to said first outlet means for receiving and discharging said second fluid.

23. The system of claim 22 wherein said directing means further comprises a first hose extending through at least a portion of said first boom member and connected at one end to said first outlet means for receiving said first fluid, and a second hose extending through at least a portion of said second boom member and connected at one end to said second outlet means for receiving said second fluid.

24. The system of claim 22 wherein said first outlet means comprises an opening provided at one end of said tubular member.

25. The system of claim 24 wherein said first outlet means further comprises a swivel sleeve mounted at said one end of said tubular member in communication with said opening for receiving said first fluid, said swivel sleeve having an opening formed therein for connection to said first boom member.

26. The system of claim 22 wherein said second outlet means comprises an opening extending through the wall of said, tubular member, additional sleeve means mounted on said tubular member for rotation relative thereto, an outlet fitting on said additional sleeve means, and means connecting said opening during rotation of said additional sleeve means.

27. The system of claim 26 wherein said additional sleeve means is adapted to rotate relative to said tubular member independently of the rotation of said first and second sleeve means.

28. The system of claim 26 wherein said connecting means comprises means defining an annular chamber between said tubular member and said additional sleeve means for receiving said second fluid and permitting said rotation of said additional sleeve means relative to said tubular member and the discharge of said second fluid from said outlet fitting.

29. The system of claim 28 wherein said defining means comprises seal means disposed at each end of said additional sleeve means and extending between said additional sleeve means and said tubular member.

30. The system of claim 26 further comprising a conduit connecting said second fluid introducing means with said opening and extending in at least a portion of the bore of said tubular member for permitting the flow of said second fluid to said additional sleeve means independently of the flow of said first fluid through said tubular member.

* * * * *

UNITED STATES PATENT AND TRADEMARK OFFICE
CERTIFICATE OF CORRECTION

PATENT NO. : 5,110,049
DATED : May 5, 1992
INVENTOR(S) : A. Joe Harris; Wallace L. Grace It is certified that error appears in the above-indentified patent and that said Letters Patent is hereby corrected as shown below:

Column 3, line 54, change "2" to -- 26--.

Column 4, line 6, change "tub" to -- tube --.

In the Claims:

Col. 4, Claim 1, line 67, delete the comma after "means".

Claim 1, line 67, delete the comma after "respectively".

Col. 6, Claim 11, line 12, delete "additional" before "sleeve".

Claim 11, line 14, delete "additional" before "sleeve".

Claim 11, line 16, delete "additional" before "sleeve".

Claim 16, line 47, delete "a" before "second".

Signed and Sealed this

Sixth Day of September, 1994

Attest:

BRUCE LEHMAN

Attesting Officer  Commissioner of Patents and Trademarks